United States Patent [19]

Choi

[11] Patent Number: 5,745,769
[45] Date of Patent: Apr. 28, 1998

[54] MULTIPLE CONNECTION METHOD USING A SINGLE CONTROL LINK

[75] Inventor: Young-Gon Choi, Suwon, Rep. of Korea

[73] Assignee: Samsung Electronics Co., Ltd., Kyungki-do, Rep. of Korea

[21] Appl. No.: 653,478

[22] Filed: May 24, 1996

[30] Foreign Application Priority Data

May 24, 1995 [KR] Rep. of Korea ............... 1995-13076

[51] Int. Cl.$^6$ ...................................................... H04J 3/16
[52] U.S. Cl. ........................... 395/727; 379/170; 370/449
[58] Field of Search ................... 370/85.8, 95.2, 370/85.1, 449; 340/172.5, 825.25, 825.08; 395/727, 866, 290; 379/170

[56] References Cited

U.S. PATENT DOCUMENTS

| | | |
|---|---|---|
| 3,665,116 | 5/1972 | Holstrom . |
| 3,755,782 | 8/1973 | Haas et al. . |
| 3,767,859 | 10/1973 | Doering et al. . |
| 4,924,461 | 5/1990 | Amemiya et al. . |

*Primary Examiner*—Jack B. Harvey
*Assistant Examiner*—Rupal D. Dharia
*Attorney, Agent, or Firm*—Sughrue, Mion, Zinn, Macpeak & Seas, PLLC

[57] ABSTRACT

A multiple connection method using a single channel is provided. The multiple connection method includes the steps of: (a) transmitting polling addresses from the master in a predetermined sequence using the single channel; (b) receiving the polling addresses by each slave using the single channel; and (c) switching on only the transmitting terminal of the slave corresponding to the received polling address, and switching off the transmitting terminals of the other slaves. Therefore, the multiple connection is possible using only a single channel regardless of the number of communication devices commonly connected.

11 Claims, 6 Drawing Sheets

FIG. 3A
FIG. 3B
FIG. 3C
FIG. 3D
FIG. 3E

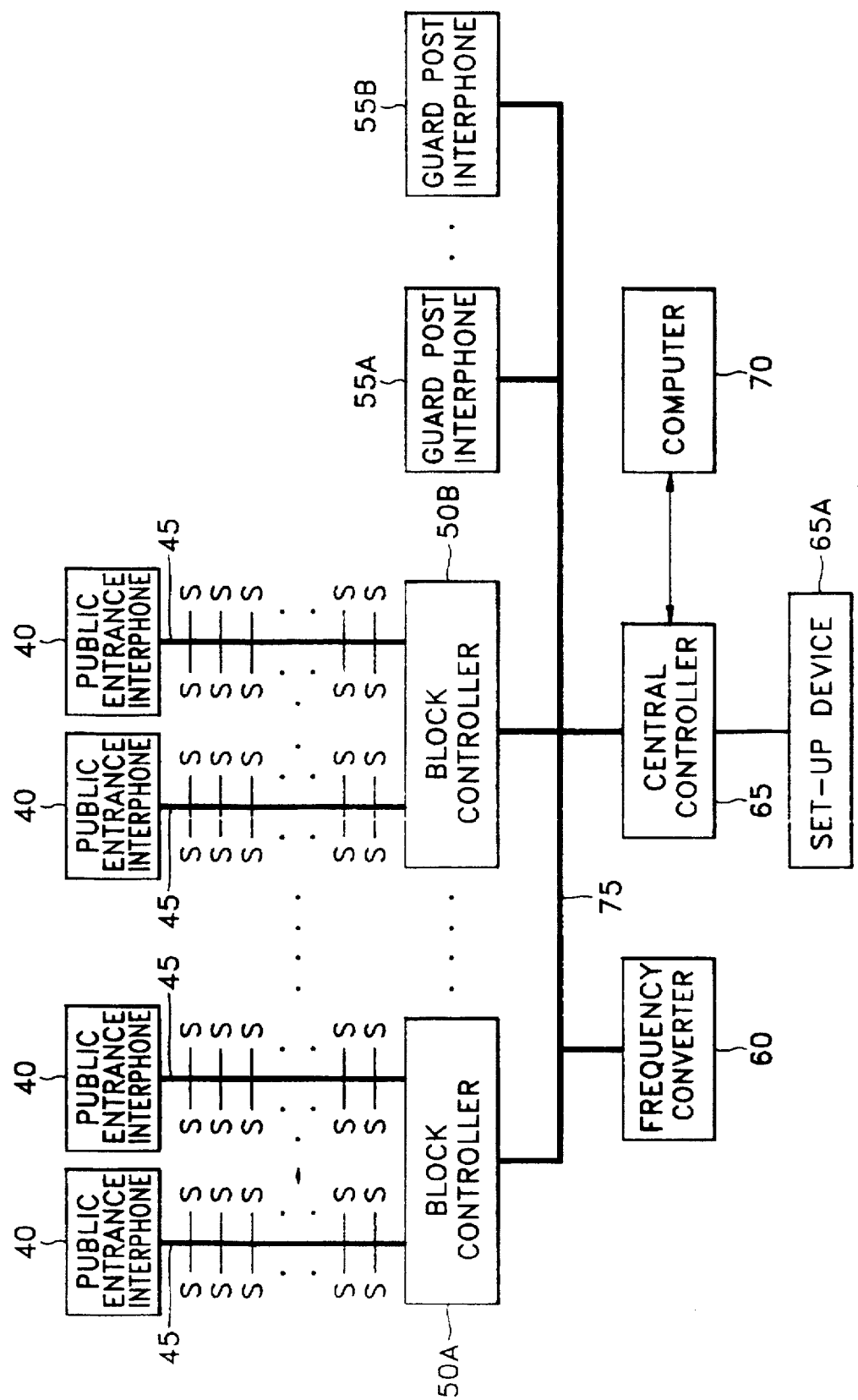

1

MULTIPLE CONNECTION METHOD USING A SINGLE CONTROL LINK

BACKGROUND OF THE INVENTION

1. Field of the Invention

The present invention relates to a communication connection method between communication devices, and more particularly, to a multiple connection method using a single control link, which is adopted into a communication device for transmitting/receiving data by a polling method.

2. Description of Related Art

In general, to transmit/receive data between devices, control data must be transmitted/received. For this purpose, a control channel, in addition to the communication channel, is assigned to each device. Thus, the number of communication channels available for actual communication decreases as the number of communication devices requiring control channels increases.

Another approach would be to perform all control maintenance via a single control link. However, when a polling communication is performed using a single control link, a receiving error is generated at the receiving side of the polling device (master) due to a transition signal generated at the transmitting side of the device (slave) responding to the polling operation. That is, irrespective of the fact that no error occurred at the receiving side of the slave, a transmitting error is generated due to the transition in the receiving device and is received by the master. Consequently, the master erroneously determines that the received response from the slave includes an error.

SUMMARY OF THE INVENTION

To solve the above problems, it is an object of the present invention to provide a multiple connection method using a single control link, by which a polling communication can be performed using only a single control link regardless of the number of interconnected communication devices.

It is another object of the present invention to provide a multiple connection method using a single control link of a collective house controller.

Yet another object of the present invention is to provide a collective house controller performing polling via a single control link.

To achieve the first object of the present invention, there is provided a multiple connection method using a single control link, for a multiple connection between at least one or more masters and a plurality of slaves in a data transmission and reception apparatus adopting a polling method, comprising the steps of: (a) transmitting polling addresses from the master in a predetermined sequence using the single control link; (b) receiving the polling addresses by each slave using the single control link; and (c) switching on the transmitting terminal of only the slave corresponding to the currently received polling address, and switching off the transmitting terminals of other slaves.

According to an optional feature of the present invention, step (c) of switching on and off the transmitting terminals further comprises the step of switching off a receiving terminal of the master when the transmitting terminal of the slave is switched on/off.

Also, to achieve the second object of the present invention, there is provided a multiple connection method using a single control link for a polling communication in a collective house controller comprising the steps of: (a') transmitting each polling address corresponding to the block controllers and the guard post interphones in a predetermined sequence using a single control link of the central controller; (b') receiving the polling addresses via the single control link in the block controllers and the guard post interphones; and (c') switching on only transmitting terminals of the block controllers or the guard post interphones corresponding to the currently received polling addresses, and switching off transmitting terminals of the other slaves.

Again, step (c') may further comprise the step of switching off the receiving terminal of the central controllers when the transmitting terminals of the block controllers or the guard post interphones are switched.

BRIEF DESCRIPTION OF THE DRAWINGS

The above objects and advantages of the present invention will become more apparent by describing in detail a preferred embodiment thereof with reference to the attached drawings in which:

FIGS. 3A to 3E are operational waveforms illustrating the multiple connection method using a single control link according to the present invention;

FIG. 4 is a block diagram illustrating the structure of a collective house controller invented by the inventor of this invention;

DETAILED DESCRIPTION OF THE INVENTION

Figure 1:
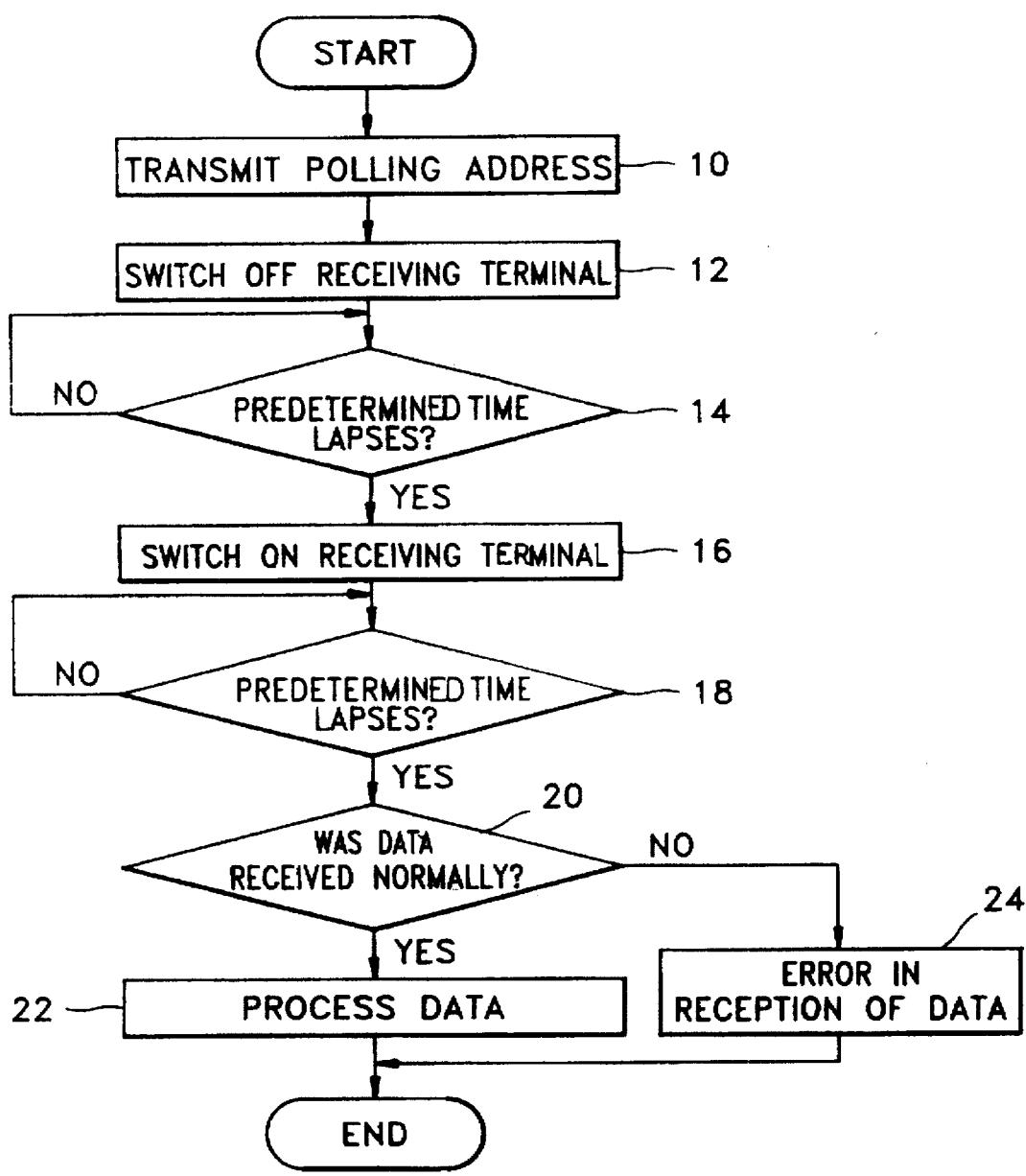
FIGS. 1 and 2 are flowcharts illustrating a multiple connection method using a single control link for a master and slave, respectively, according to the present invention.
Figure 2:
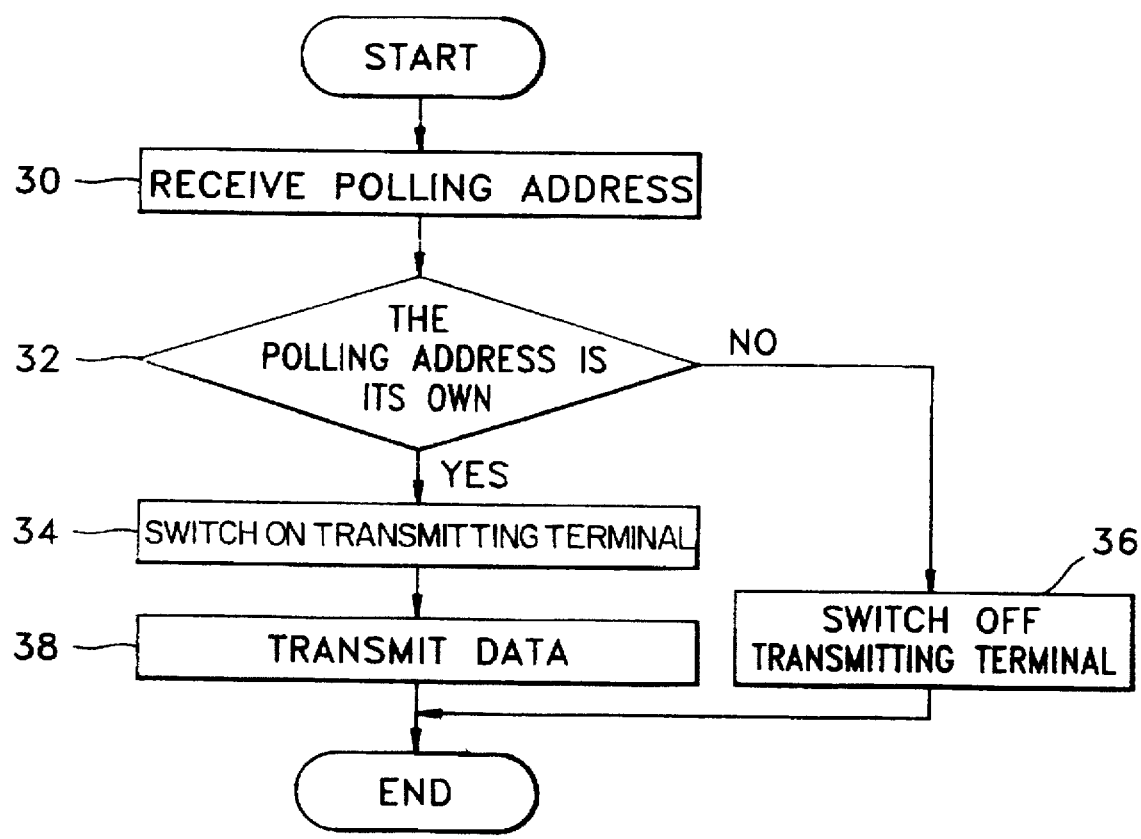

Referring to FIGS. 1 and 2, polling addresses corresponding to each slave are transmitted in a predetermined sequence from a master (step 10) via a single control link. Each slave receives the currently transmitted polling address (step 30) and determines whether the polling address is its own (step 32). As a result, if the address is for the corresponding slave, its transmitting terminal is switched on (step 34). Otherwise, the transmitting terminal is switched off (step 36). Consequently, a transition signal is generated due to the switching on/off of the transmitting terminal, which adversely affects the receiving terminal of the master.

In order to prevent an error in reception of data, caused by the transition signal, the receiving terminal of the master is switched off for a predetermined time period when the transmitting terminal of the slave is switched on (steps 12 and 14). That is, in practice the master may turn off its receiving terminal upon transmission of each of the polling addresses. After the predetermined time period has lapsed, the master turns on the receiving terminal (step 16), to receive the data transmitted by the slave (step 38).

Subsequently, the master determines whether a second predetermined period has lapsed (step 18). If so, the master verifies whether the data was received normally (step 20). Then, if the reception of data is normal, the master processes the received data (step 22). However, if the data reception is abnormal, the data reception is processed as an error (step 24).

As seen from the above description, the master is prevented from recognizing the switching of the slaves' transmission terminals as a transmission error. Also, in order to eliminate the effect of the transition signal generated during the switching of the master's receiving terminal, the reception of the data is delayed for a predetermined amount of time.

FIGS. 3A to 3E are operational waveforms of the master and its slaves. In detail, FIG. 3A is a waveform representing a polling address transmission from the master, and FIGS. 3B to 3E are waveforms representing the polling address reception and data transmission of four slaves.

First, the polling address is transmitted from the master in a predetermined sequence, and each slave receives the polling address and switches on ("low" level in FIGS. 3A to 3E) its own transmitting terminal to start the data transmission if the received polling address is its own. When the data transmission and reception between the master and one selected slave is completed, the master starts to transmit the next polling address.

As shown in FIGS. 3B to 3E, when one slave recognizes the polling address as its own and switches its transmitting terminal on, the other salves keeps their transmitting terminal off. As also shown in FIGS. 3A to 3E, in the preferred embodiment the transmitting terminals of all the slaves are kept off while the master transmit the polling address.

Figure 5:
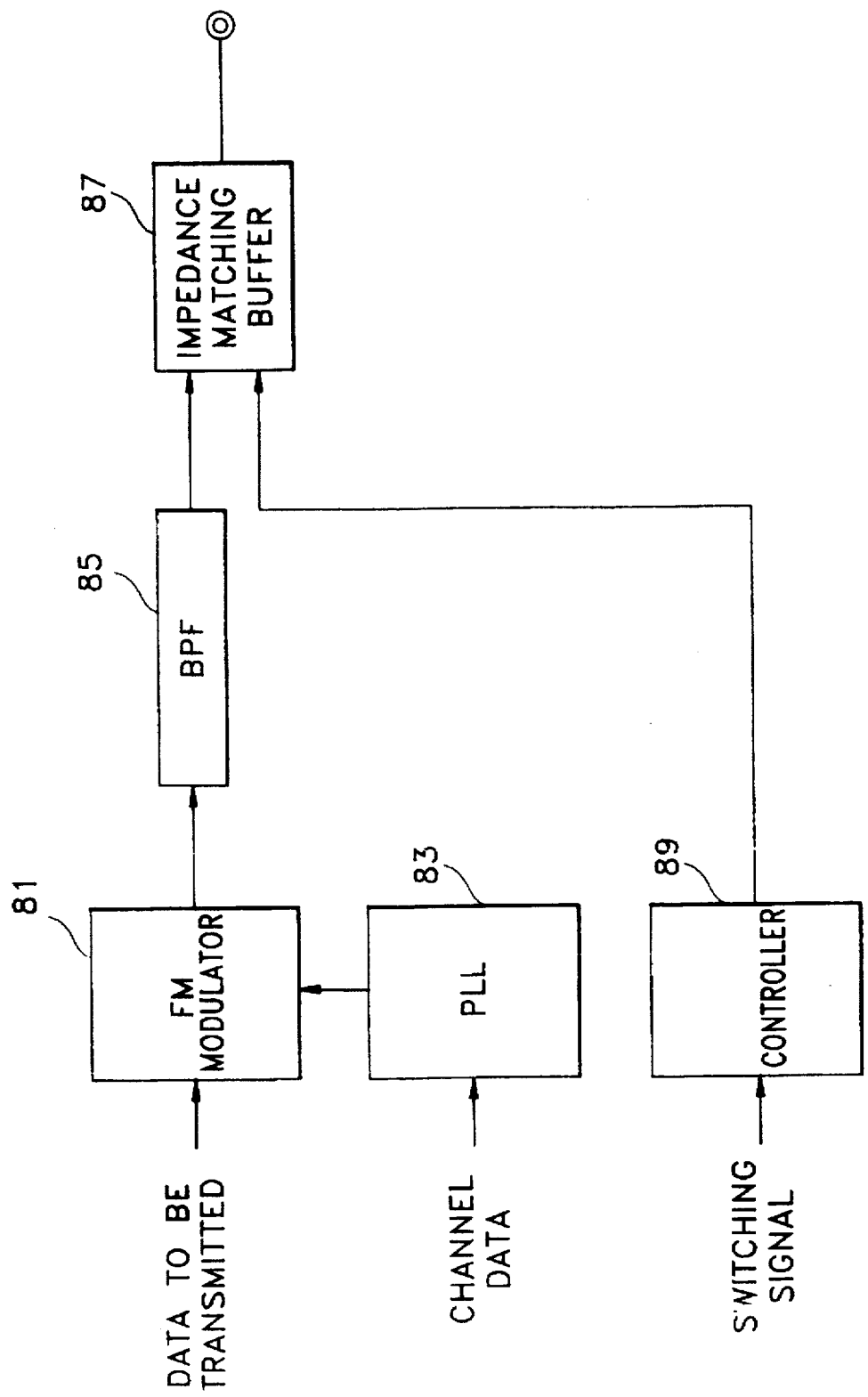
FIG. 5 is a block diagram illustrating a data transmitting portion of the block controller or the guard post interphone of FIG. 4.
Figure 6:
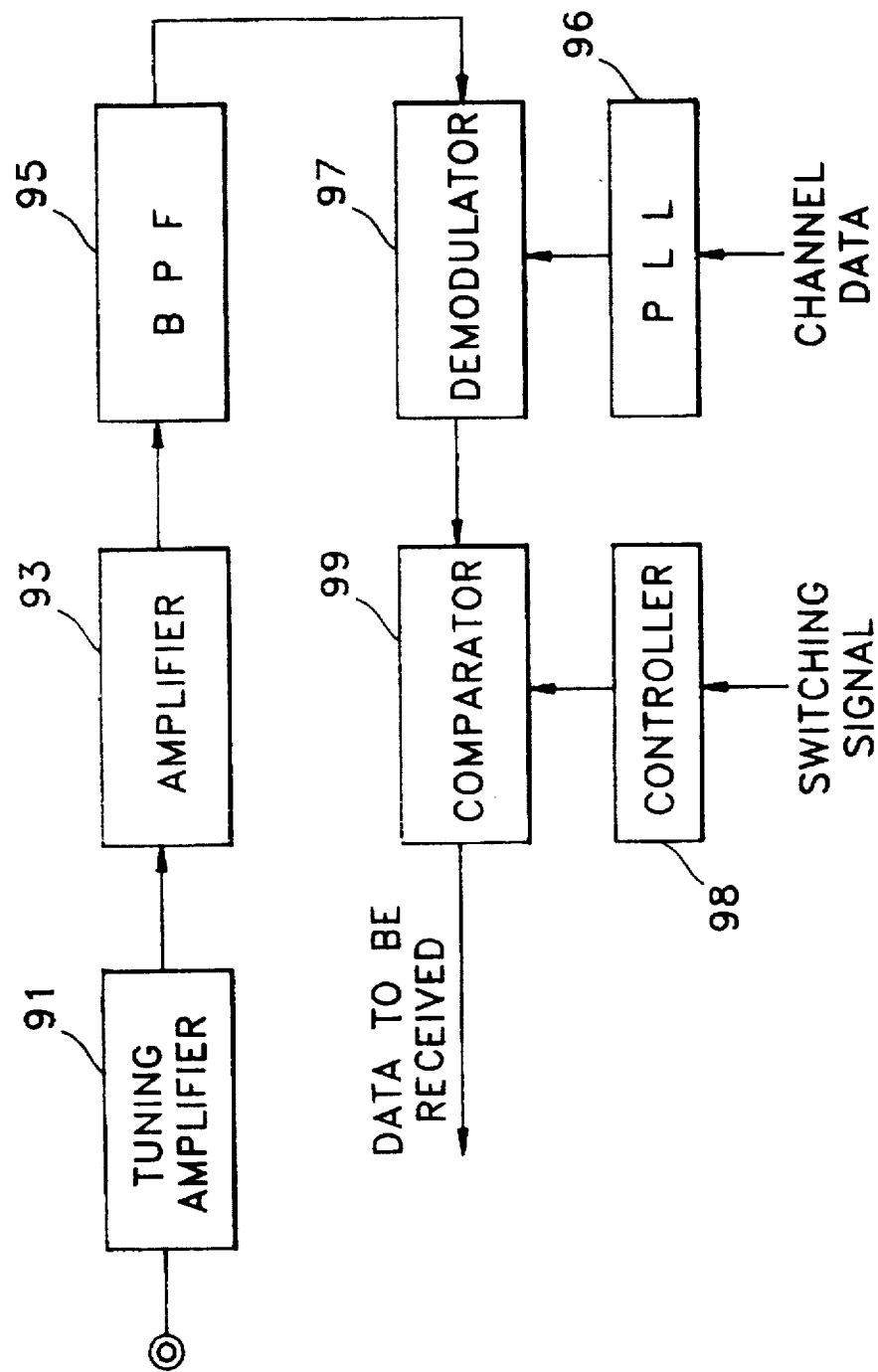
FIG. 6 is a block diagram illustrating a data receiving portion of the central controller of FIG. 4.

Referring to FIGS. 4, 5 and 6, a preferred embodiment of the present invention will be described as follows.

FIG. 4 is a block diagram illustrating a collective house controller invented by the inventor of the present invention. Referring to FIG. 4, a collective house controller according to the present invention includes first and second single coaxial cables 45 and 75, a household interphone S installed in each household connected to the first single coaxial cable 45, a public entrance interphone 40 which is installed at each public entrance to be commonly used by a plurality of households, block controllers 50A and 50B for relaying calls between households in the same block, guard post interphones 55A and 55B which are installed at the guard posts and where a concierge is stationed for supervising one or more blocks, a central controller 65 for controlling and relaying calls within a block or between blocks, a frequency converter 60, and a computer 70.

The public entrance interphone 40 is connected to the household interphones S, installed at households which use the public entrance, via the first single coaxial cable 45. Also, the block controllers 50A and 50B, the guard post interphones 55A and 55B, and the central controller 65 are connected to each other via the second single coaxial cable 75, and a multiple frequency dividing communication method is used for enabling calls and information exchange using the single coaxial cable.

According to the above-described communication method, a plurality of frequency-allocated communication channels are required. To that effect, a given frequency band is divided into a transmission frequency band and a reception frequency band, both of which are again divided to obtain a predetermined bandwidth for each channel. Each bandwidth is allocated as one communication channel.

If, for example, the transmission and reception frequency bands are chosen as 30–35.12 MHz and 112.705–117.825 MHz, respectively, and the bandwidth is chosen as 20 KHz, then 256 communication channels can be obtained. The number of communication channels may be changed according to the determined frequency band and bandwidth.

In the preferred embodiment, these 256 communication channels include two control channels, collectively referred to as a single control link, one for transmission and one for reception of control data. Thus, 254 channels remain for communication: 127 channels for transmission and 127 channels for reception. That is, 127 call paths can be formed, each path including a transmission channel and a reception channel.

The central controller 65 polls each of the block controllers 50A and 50B and each of the guard posts 55A and 55B, so as to control the 254 communication channels obtained by the above frequency allocation. That is, the central controller 65 provides block information to the corresponding block controller using the transmission and reception control channels and a set-up device 65A is used to set up such information. Also, the central controller 65 allocates a predetermined number of communication channels to each of the block controllers 50A and 50B for call relaying between households of the same block. Further, if additional communication channels are required by the block controllers 50A and 50B, the central controller 65 additionally allocates unused communication channels from among the non-allocated communication channels thereto.

The central controller 65 and the block controllers 50A and 50B use the transmission and reception control channels so as to transmit and receive the control data. The block controllers 50A and 50B control the communications among the public entrance interphones 40 and the household interphones S using a carrier sense multiple access with collision detection (CSMA/CD) method adopting a baseband alternate mark inversion (AMI) waveform, so as to control the communication channels allocated from the central controller 65. Also, if calls in the same block are required, the block controllers 50A and 50B perform the call relay in the same block using the communication channels initially allocated from the central controller 65.

For inter-block calls, the block controllers 50A and 50B require the central controller 65 to relay calls between blocks. Here, the central controller 65 allocates an unused communication channel among the non-allocated communication channels to the corresponding block controller, and the block controller reallocates this allocated communication channel to the corresponding household interphone. Thus, calls between each interphone can be performed by allocating a transmission and reception communication channel.

The frequency converter 60 is connected to the second single coaxial cable 75 to convert an input 30 MHz transmission frequency band into a 117 MHz reception frequency band, and output the result.

According to an advantageous feature of the inventive multi-block communication system, each household interphone S is connected to sensors to detect various information associated with each household, such as a break-in, gas leakage and electrical problems. The interphone S then converts the detected information to the corresponding control data, transmits the data to the corresponding block controller via the control channel, and to the central controller 65. The central controller 65 transmits the data to the guard post interphones 55A and 55B, thereby providing the information to the concierge at the guard post and alerting him as to any emergency.

Optionally, the concierge can be connected to the household interphone S, and speak with a household of the supervised block, a household of blocks supervised by other concierges, or another guard post, through the call relay of the central controller 65, using the guard post interphones 55A and 55B. Also, the concierge has total control over various types of information associated with each household and can take proper action according to the information relayed over the control channel.

The computer 70 stores the information of each household to control the information therein, processes the information by transmitting and receiving information data to and from the central controller 65, and exchanges the information via a communication network. Particularly, the computer 70 can provide information regarding the households to the proper authorities. A preferable method would be to provide the information in the form of selectively outputting an audio signal pre-stored therein via a public telephone network, as required.

In the above-described collective house controller, the polling communication is performed through the transmission and reception control channels for relaying calls among the central controller 65, block controllers 50A and 50B and guard post interphones 55A and 55B. Here, the central controller 65 as a master, and the block controllers 50A and 50B and the guard post interphones 55A and 55B as slaves perform the polling communication, respectively.

FIG. 5 shows the data transmitting portion of the block controllers 50A and 50B and the guard post interphones 55A and 55B of the collective house controller shown in FIG. 4, being constituted of an FM modulator 81, a phase locked loop (PLL) 83, a band pass filter (BPF) 85, an impedance matching buffer 87, and a controller 89.

In the operation of the above structure, the FM modulator 81 performs frequency modulation of the data to be transmitted into a corresponding frequency band according to the output signal of the PLL 83. The frequency modulated data are filtered through the BPF 85 and then output to the coaxial cable via the impedance matching buffer 87. The PLL 83 determines a frequency modulation band according to the channel data and the controller 89 switches the impedance matching buffer 87 according to a switching signal.

FIG. 6 shows a data receiving portion of the central controller 65 of the collective house controller shown in FIG. 4. The data receiving portion is constituted of a tuning amplifier 91, an amplifier 93, a BPF 95, a demodulator 97, a PLL 96, a comparator 99 and a controller 98. The signal input via the coaxial cable is amplified into a predetermined frequency band set by the tuning amplifier 91, and then the amplified signal is amplified again by the amplifier 93. Next, a band pass filtering is performed by the BPF 95 and then the filtered signal is demodulated by the demodulator 97. Here, the PLL 96 determines a demodulation frequency band for the demodulator 97 according to channel data. Then, the comparator 99 comparatively detects reception data from the signal demodulated by the demodulator 97. Here, the controller 98 switches the comparator 99 according to a switching signal.

Referring to FIGS. 4 to 6, a multiple connection method using a single control link in the collective house controller will be described as follows.

First, the central controller 65 transmits polling addresses according to a predetermined sequence for performing a polling communication with the block controllers 50A and 50B and the guard post interphones 55A and 55B. The polling transmission is performed over the two transmission and reception control channels, i.e., the single control link. The block controllers 50A and 50B and the guard post interphones 55A and 55B receive the transmitted polling addresses and determine respectively whether the received polling addresses match their own. If a particular polling address matches certain device's address, the data transmitting terminal (shown in FIG. 5) of this device is switched on. Otherwise, each data transmitting terminal is switched off. Thus, with respect to each currently transmitted address, only one device would turn its transmitting terminal on, while the remaining devices would have their transmitting terminals off.

When the impedance matching buffer 87 (shown in FIG. 5) is switched when switching the transmitting terminal, a transition signal is generated in the coaxial cable which affects the receiving terminal (of FIG. 6) of the central controller 65. As a result, an error is generated in the received data which is detected by the comparator 89. In order to prevent the error, according to a feature of the present invention, the receiving terminal of the central controller 65 is switched off when the transmitting terminals of the block controllers 50A and 50B and the guard post interphones 55A and 55B are switched on/off. Then, a corresponding slave (one of the block controllers 50A and 50B or the guard post interphones 55A and 55B recognizing the currently transmitted address as its own) transmits data and the receiving terminal of the central controller 65 is switched on after a predetermined time lapse to receive the data. If no error is detected in the received data, the received signal is processed. Otherwise, the data reception is processed as an error.

Thus, in order to prevent the data transmission error generated at the transmitting terminals of the block controllers 50A and 50B and the guard post interphones 55A and 55B due to a transition signal generated when the receiving terminal of the central controller 65 is switched on, the data reception is delayed for a predetermined time period. After the transmission and reception of the data are completed, the central controller 65 retransmits the polling addresses in accordance with the set predetermined sequence.

As described above, according to the present invention, the multiple connection is possible using only a single transmission and a single reception channels, so that the polling communication can be performed without additional channel allocation in proportion to the number of the communication devices. That is, each additional device would be accommodated simply by adding its address to the sequence of the transmitted polling addresses over the same control link. Consequently, any increase in bandwidth can be allocated directly to communication channels, since the original two control channels can easily accommodate additional devices.

What is claimed is:

1. A multiple connection method using a single channel, for a multiple connection between at least one master and a plurality of slaves in a data transmission and reception apparatus adopting a polling method, comprising the steps of:

(a) transmitting polling addresses from the master in a predetermined sequence using said single channel;

(b) receiving the polling addresses by each of the slaves using said single channel; and (c) switching on transmitting terminal of only one of the slaves which corresponds to the currently received polling address, and switching off the transmitting terminals of other slaves.

2. A multiple connection method using a single channel as claimed in claim 1, wherein said step (c) further comprises the step of switching off a receiving terminal of the master when the transmitting terminal of one of the slaves is switched on/off.

3. A multiple connection method using a single channel for a polling communication in a collective house controller comprising at least one block controller for relaying calls between households, at least one guard post interphones connected with said block controller via a single coaxial cable and installed at the guard posts, and a central controller connected to said single coaxial cable for relaying calls, said multiple connection method comprising the steps of:

(a) transmitting each polling address corresponding to said block controller and said guard post interphones in a predetermined sequence using a single channel of said central controller;

(b) receiving the polling addresses via said single channel in said block controllers and said guard post interphones; and (c) switching on transmitting terminals of only one of said block controller and said guard post interphones which corresponds to the received polling addresses, and switching off transmitting terminals of remaining clock controller and guard post interphones.

4. A multiple connection method using a single channel as claimed in claim 3, wherein said step (c) further comprises the step of switching off the receiving terminal of said central controller when the transmitting terminal of one of said block controller and said guard post interphones is switched on/off.

5. A collective house communication controller using a single control channel for a polling communication, comprising:

a plurality of block controllers, each for relaying calls between households in a single neighborhood block, said block controllers interconnected via a single coaxial cable;

a central controller connected to said single coaxial cable for relaying calls, said central controller designating said single control channel to be utilized over said single coaxial cable;

wherein said central controller is pre-programmed to perform said polling communication by sequentially transmitting polling addresses over said control channel, and wherein each of said plurality of block controllers is pre-programmed to compare each of said polling addresses to a memorized polling address and turning on a corresponding transmitting terminal when one of said polling addresses matches said memorized polling address, and turning off said corresponding transmitting terminal when the polling address does not match said memorized polling address.

6. The collective house communication controller of claim 5, wherein said central controller is further preprogrammed to turn off a receiving terminal for a predetermined time period after transmitting each of said polling addresses.

7. The collective house communication controller of claim 6, further comprising a guard post interphone connected to said single coaxial cable and pre-programmed to compare each of said polling addresses to a memorized polling address and turning on a corresponding transmitting terminal when one of said polling addresses matches said memorized polling address, and turning off said corresponding transmitting terminal when the polling address does not match said memorized polling address.

8. The method of claim 2, wherein said step (c) further comprises the step of monitoring the elapse of a predetermined period after the receiving terminal of the master has been switched off, and turning the receiving terminal of the master back on after the predetermined period has elapsed.

9. The method of claim 8, wherein said step (c) further comprises the step of monitoring the elapse of a second predetermined period after the receiving terminal of the master has been switched back on, and determining whether data is received normally after the second predetermined period has elapsed.

10. The method of claim 4, wherein said step (c) further comprises the step of monitoring the elapse of a predetermined period after the receiving terminal of the central controller has been switched off, and turning the receiving terminal of the central controller back on after the predetermined period has elapsed.

11. The method of claim 10, wherein said step (c) further comprises the step of monitoring the elapse of a second predetermined period after the receiving terminal of the central controller has been switched back on, and determining whether data is received normally after the second predetermined period has elapsed.

* * * * *